(12) United States Patent
Katar et al.

(10) Patent No.: US 9,986,492 B2
(45) Date of Patent: May 29, 2018

(54) DYNAMIC WI-FI ROAMING THRESHOLDS FOR DENSE ACCESS POINT ENVIRONMENTS

(71) Applicant: QUALCOMM Incorporated, San Diego, CA (US)

(72) Inventors: Srinivas Katar, Fremont, CA (US); Xiaolong Huang, San Jose, CA (US); Keshav Kishore Sahai, San Diego, CA (US); Farrukh Usmani, Carlsbad, CA (US); Hoon Ki Lee, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 14/843,597

(22) Filed: Sep. 2, 2015

(65) Prior Publication Data

US 2017/0064618 A1    Mar. 2, 2017

(51) Int. Cl.
| | |
|---|---|
| *H04W 24/10* | (2009.01) |
| *H04W 8/02* | (2009.01) |
| *H04B 17/318* | (2015.01) |
| *H04W 24/02* | (2009.01) |
| *H04W 48/16* | (2009.01) |
| *H04L 12/26* | (2006.01) |

(52) U.S. Cl.
CPC .......... *H04W 48/16* (2013.01); *H04B 17/318* (2015.01); *H04L 43/16* (2013.01); *H04W 8/02* (2013.01); *H04W 24/02* (2013.01); *H04W 24/10* (2013.01)

(58) Field of Classification Search
CPC ....... H04W 48/16; H04W 24/02; H04W 8/02; H04W 24/10; H04L 43/16
See application file for complete search history.

(56) References Cited

U.S. PATENT DOCUMENTS

| | | | |
|---|---|---|---|
| 8,155,081 B1 * | 4/2012 | Mater | H04W 4/04 370/254 |
| 8,805,374 B2 | 8/2014 | Zhu et al. | |
| 8,937,971 B1 | 1/2015 | Vellanki | |
| 2006/0142004 A1 | 6/2006 | He et al. | |
| 2006/0187873 A1 | 8/2006 | Friday et al. | |

(Continued)

OTHER PUBLICATIONS

IPEA/EP, Second Written Opinion of the International Preliminary Examining Authority, Int'l Application No. PCT/US2016/039907, dated Oct. 12, 2016, 14 pgs., European Patent Office, P.B. 5818 Patentlaan 2, NL-2280 HV Rijswijk.

*Primary Examiner* — Muthuswamy Manoharan
(74) *Attorney, Agent, or Firm* — Holland & Hart LLP/Qualcomm

(57) ABSTRACT

Methods, systems, and devices are described for wireless communications. A communication device may utilize enhanced roaming techniques to dynamically adjust signal strength thresholds in a high density AP environment. For instance, a communication device determines a signal strength of a communication link between a wireless device and an access point (AP). The communication device further compares the signal strength value to at least a low threshold and a high threshold and performs a channel scan for the communication link when the signal strength value is below the low threshold. The communication device also adjusts the low threshold when the signal strength value is greater than the high threshold.

18 Claims, 11 Drawing Sheets

(56) References Cited

U.S. PATENT DOCUMENTS

| | | | |
|---|---|---|---|
| 2008/0075035 A1* | 3/2008 | Eichenberger | H04W 36/08 370/328 |
| 2008/0285520 A1* | 11/2008 | Forte | H04W 36/0011 370/331 |
| 2010/0097982 A1* | 4/2010 | Eichenberger | H04W 36/08 370/328 |
| 2011/0122319 A1* | 5/2011 | Tenbarge | H04N 5/50 348/570 |
| 2011/0153805 A1 | 6/2011 | Beninghaus et al. | |
| 2011/0299422 A1 | 12/2011 | Kim et al. | |
| 2012/0115510 A1 | 5/2012 | Denby et al. | |
| 2013/0150012 A1* | 6/2013 | Chhabra | H04W 48/16 455/418 |
| 2014/0059218 A1* | 2/2014 | Ganu | H04W 76/04 709/224 |
| 2014/0126554 A1 | 5/2014 | Alapuranen et al. | |
| 2014/0135032 A1 | 5/2014 | Kim et al. | |
| 2014/0301328 A1 | 10/2014 | Yacovitch | |
| 2014/0328191 A1 | 11/2014 | Barriac et al. | |
| 2014/0328270 A1 | 11/2014 | Zhu et al. | |
| 2015/0043362 A1 | 2/2015 | Sankar et al. | |
| 2015/0092555 A1 | 4/2015 | Tam et al. | |
| 2015/0215950 A1* | 7/2015 | Amini | H04W 52/0212 370/252 |
| 2017/0064536 A1 | 3/2017 | Katar et al. | |

\* cited by examiner

DYNAMIC WI-FI ROAMING THRESHOLDS FOR DENSE ACCESS POINT ENVIRONMENTS

BACKGROUND

Field of the Disclosure

The present disclosure, for example, relates to wireless communication systems, and more particularly to adjusting signal strength thresholds for roaming of a wireless device in a dense access point (AP) environment.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the access point).

Some WLAN environments may include a large number of APs within a small area. These environments may be considered high density AP environments. Wireless devices in a high density AP environment using existing roaming mechanisms may not efficiently roam among the APs. Existing roaming mechanisms may use a static received signal strength indication (RSSI) threshold. These static thresholds may not be very suitable for a wireless device within a high density AP environment. For example, a current Wi-Fi roaming implementation is designed to enable roaming when the RSSI is below −76 Decibel-milliwatts (dBm). However, in a high density AP environment, the RSSI from the closest AP may be above −65 dBm. Furthermore, a wireless device in a high density environment can perform unnecessary channel scans that drain power resources. Only a single channel map is used and replaced with each channel scan.

SUMMARY

Methods, apparatus, and techniques described herein add new roaming triggers for a wireless device in an active scan region. The active scan region is defined as a RSSI level, such as −76 dBm to −55 dBm. The wireless device dynamically sets a low RSSI threshold and a high RSSI threshold each time a detected RSSI level experiences a significant and persistent change. At least a partial low RSSI threshold channel scan is triggered when RSSI breaches the low RSSI threshold. A full channel scan is triggered when the RSSI goes below a fixed low RSSI threshold. When a channel scan is triggered, the wireless device performs a partial or full channel scan and may save the results as one of multiple channel maps.

In a first set of illustrative examples, a method for wireless communication is described. In one configuration, the method includes determining a signal strength of a communication link between a wireless device and an AP and comparing the signal strength value to at least a low threshold and a high threshold. The method further includes performing a channel scan for the communication link when the signal strength value is below the low threshold. The method also includes adjusting the low threshold when the signal strength value is greater than the high threshold.

In a second set of illustrative examples, an apparatus for wireless communication is described. In one configuration, the apparatus includes a signal strength monitor to determine a signal strength of a communication link between a wireless device and an AP. The apparatus also includes a signal strength threshold manager to compare the signal strength value to at least a low threshold and a high threshold. The apparatus further includes a channel scanner to perform a channel scan for the communication link when the signal strength value is below the low threshold. The signal strength threshold manger also adjusts the low threshold when the signal strength value is greater than the high threshold.

In a third set of illustrative examples, a communication device for wireless communication is described. In one configuration, the communication device includes means for determining a signal strength of a communication link between a wireless device and an AP. The communication device also includes means for comparing the signal strength value to at least a low threshold and a high threshold and means for performing a channel scan for the communication link when the signal strength value is below the low threshold. The communication device further includes means for adjusting the low threshold when the signal strength value is greater than the high threshold.

In a fourth set of illustrative examples, a non-transitory computer-readable medium storing computer-executable code for wireless communication is described. In one configuration, the computer-executable code is executable by a processor to cause a wireless device to determine a signal strength of a communication link between a wireless device and an AP and compare the signal strength value to at least a low threshold and a high threshold. The computer-executable code is further executable by the processor to cause the wireless device to perform a channel scan for the communication link when the signal strength value is below the low threshold and adjust the low threshold when the signal strength value is greater than the high threshold.

Some examples of the methods, apparatuses, wireless devices, and non-transitory computer-readable mediums include adjusting the low threshold and the high threshold based at least in part on detecting, from the comparison, that the signal strength value has crossed the high threshold or the low threshold. In some examples, determining the signal strength for the communication link includes performing a plurality of consecutive signal strength measurements, wherein performing the channel scan is based at least in part on a determination that the signal strength value is above the high threshold or below the low threshold for a predefined number of the consecutive signal strength measurements. Further examples include detecting a change in the signal strength value larger than or equal to a signal strength change threshold and adjusting the low threshold and the high threshold based at least in part on detecting the change in the signal strength value.

In some examples, performing the channel scan further includes performing one of a full scan using all available channels for the communication link and a partial scan using a subset of the available channels, wherein a selection of the full scan or the partial scan is based at least in part on the low threshold. In another example, performing the channel scan further includes determining a subset of available channels for the communication link, wherein the subset includes available channels with the strongest signal based on a channel map and performing a partial channel scan using the subset of available channels, wherein the available channels in the subset are scanned in an order from strongest to weakest. In some examples, performing the channel scan further includes scanning all available channels when no channel map is available. Performing the channel scan can further include performing one of a full scan using all available channels for the communication link and a partial scan using a subset of the available channels, wherein a selection of the full scan or the partial scan is based at least in part on a likelihood of finding an AP to roam to outside a subset of strongest available channels identified in a channel map.

Some examples of the methods, apparatuses, wireless devices, and non-transitory computer-readable mediums further include triggering a 5G preference scan when the signal strength value is equal to or above the high threshold a predefined number of times. Some examples also include determining that the wireless device is within a high density AP environment, wherein performing the channel scan is based on the wireless device being within the high density AP environment. Additional examples include adjusting the low threshold based at least in part on detecting, from the comparison, that the signal strength value has crossed the high threshold and the high threshold is above a predefined high threshold value.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In high density access point (AP) environments, it may be suitable for a wireless device to roam to another AP sooner or later than done in low density AP environments. A high density AP environment includes many APs within a small geographic area, such as within an office building, campus, or conference hall. In a high density AP environment, it can be beneficial to enable roaming even when received signal strength indication (RSSI) is greater than −76 dBm while incorporating techniques to prevent unnecessary scans for power saving purposes.

New roaming enhancements are built upon existing roaming mechanisms. Techniques described herein add additional roaming triggers and scan enhancements in an active scan region (e.g., RSSI between −76 dBm and −55 dBm). These new roaming triggers include dynamically setting a low RSSI threshold and a high RSSI threshold every time the RSSI experiences a significant and persistent change, triggering a low RSSI threshold scan every time the low RSSI threshold is breached, triggering one time full scan when low RSSI threshold is above a certain value (e.g., −60 dBm). A high RSSI threshold does not trigger scans when associated with a 5G AP.

In one example, a wireless device is connected to an AP and measures a certain RSSI that is within an active scan region. If the RSSI rises above a high threshold, the high and the low thresholds are increased. The thresholds may be increased each time the high threshold is breached until the RSSI is outside (e.g., above) the active scan region. On the other hand, if the RSSI drops below a low threshold, the wireless device performs at least a partial channel scan. If the RSSI drops below the low threshold a predefined number of times, or below an absolute low threshold, the wireless device may perform a full channel scan. A channel map from the full channel scan can be saved for the location of the wireless device, regardless of the existence of other channel maps for the same AP. The channel map may be used to replace at least a portion of a full channel scan for a roaming operation.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
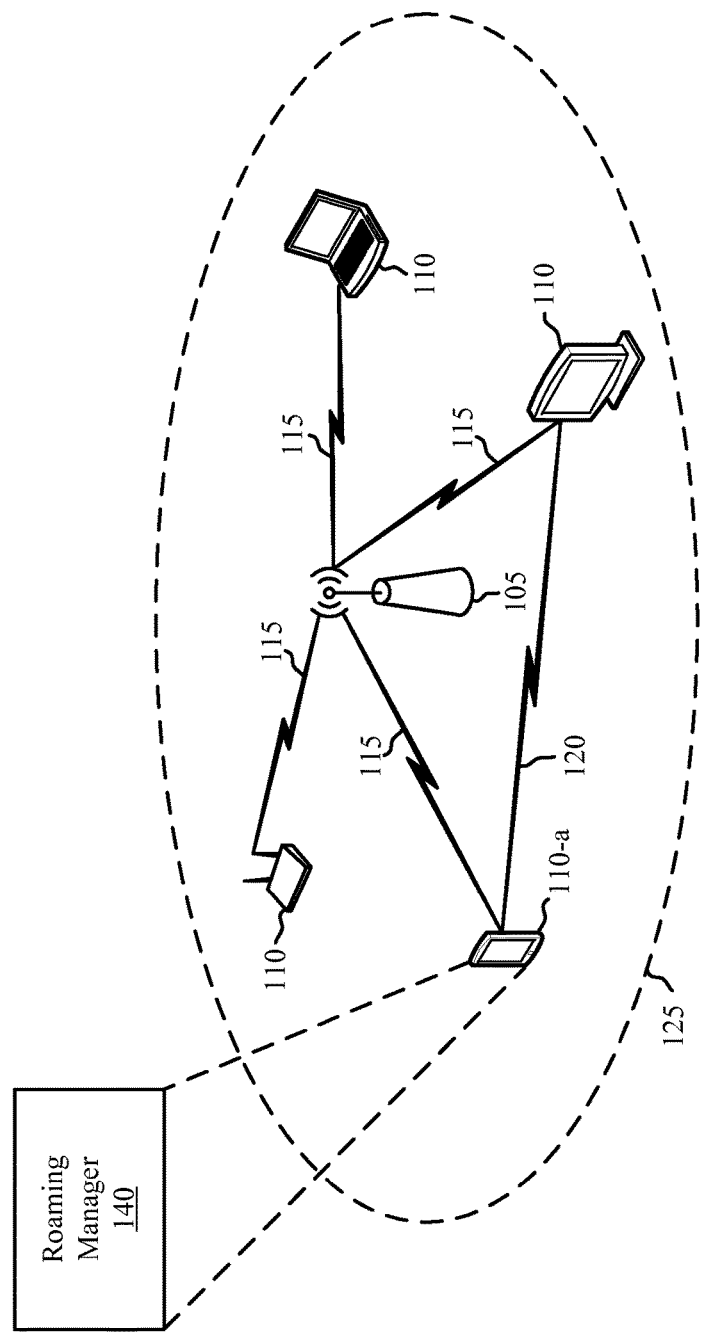
FIG. 1 illustrates an example of a network, such as a WLAN, that supports roaming enhancements in a WLAN in accordance with various aspects of the present disclosure.

Referring first to FIG. 1, a block diagram illustrates an example of a WLAN network 100 such as, e.g., a network implementing at least one of the IEEE 802.11 family of standards. The WLAN network 100 includes an AP 105 and one or more wireless devices or stations (STAs) 110, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the WLAN network 100 may have multiple APs 105. Each of the wireless devices 110, which can also be referred to as mobile stations (MSs), mobile devices, access terminals (ATs), user equipment (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile.

Figure 2:
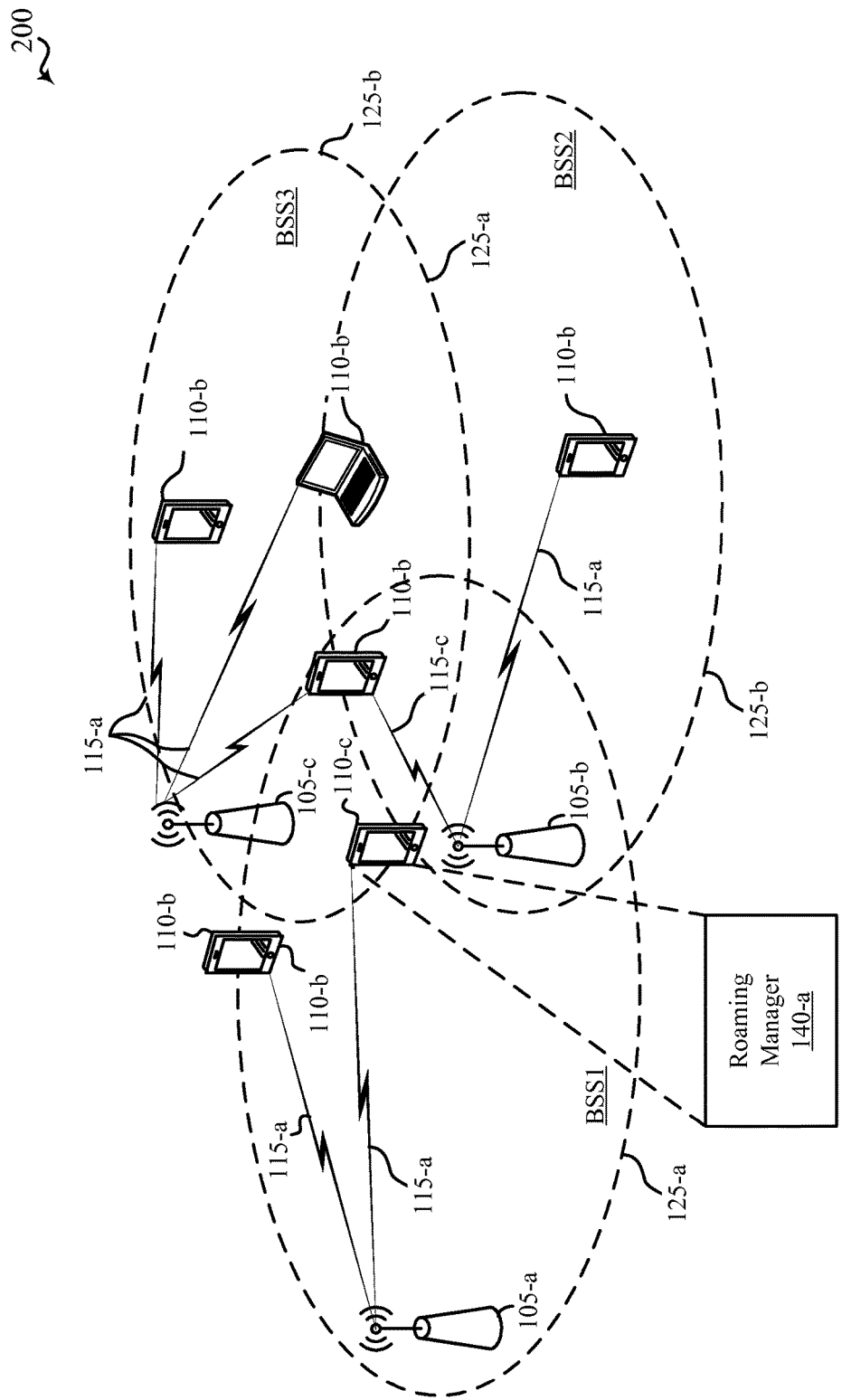
FIG. 2 illustrates an example of a high density AP environment with a wireless communication system that supports roaming enhancements in accordance with various aspects of the present disclosure.

A wireless device 110 can be covered by more than one AP 105 and can therefore associate with one or more APs 105 at different times, such as is shown in FIG. 2. A single AP 105 and an associated set of wireless devices 110 can be referred to as a basic service set (BSS). An extended service set (ESS) is a set of connected BSSs. A distribution system (DS) is used to connect APs 105 in an extended service set. A geographic coverage area 125 for an access point 105 can be divided into sectors making up only a portion of the coverage area. The WLAN network 100 may include access points 105 of different types (e.g., metropolitan area, home network, etc.), with varying sizes of coverage areas and overlapping coverage areas for different technologies. Other wireless devices can communicate with the AP 105 as well.

While the wireless devices 110 may communicate with each other through the AP 105 using communication links 115, each wireless device 110 may also communicate directly with one or more other wireless devices 110 via a direct wireless link 120. Two or more wireless devices 110 can communicate via a direct wireless link 120 when both wireless devices 110 are in the AP geographic coverage area 125 or when one or neither wireless device 110 is within the AP geographic coverage area 125. Examples of direct wireless links 120 include Wi-Fi Direct connections, connections established by using a Wi-Fi Tunneled Direct Link Setup (TDLS) link, and other P2P group connections. The wireless devices 110 in these examples can communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within WLAN network 100.

A wireless device 110, such as wireless device 110-a, includes a roaming manager 140. The roaming manager 140 implements at least some of the roaming enhancements described herein. For example, the roaming manager 140 causes the wireless device 110-a to detect a signal strength value (such as an RSSI level) and compare the detected signal strength value to a high threshold and a low threshold. When the signal strength value is below the low threshold, the roaming manager 140 causes the wireless device 110-a to perform a channel scan for a connected communication link. When the signal strength value is above the high threshold, the roaming manager 140 causes the wireless device 110-a to adjust the low threshold.

The roaming manager 140 may, instead or additionally, perform at least a partial channel scan while the wireless device is connected to an AP associated with a basic service set identifier (BSSID). The roaming manager 140 selects a channel map from a plurality of channel maps associated with the BSSID based at least in part on the partial scan, wherein each of the channel maps associated with the BSSID comprises a different set of signal strength measurements for a same set of neighboring APs. The selected channel map can be used as a basis for a roaming operation by the wireless device.

FIG. 2 illustrates an example of a high density AP environment 200 with a wireless communication system that supports roaming enhancements in accordance with various aspects of the present disclosure. The high density AP environment 200 in FIG. 2 shows three APs 105-a each having their own BSS. Three basic service sets are shown in FIG. 2, BSS1, BSS2, and BSS3. Wireless devices 110-b and 110-c are dispersed throughout the high density AP environment 200. High density AP environment 200 includes wireless devices 110-b and 110-c, and APs 105-a through 105-c, which are respective examples of the wireless device 110 and AP 105 of FIG. 1. A wireless device 110-c is covered by three APs 105-b and can therefore associate with one or more APs 105-b at different times. In other examples, the wireless device 110-c is covered by additional APs. In one example, the wireless device 110-c is covered by up to fifty or more APs.

The roaming manager 140-a performs channel scans and updates RSSI thresholds based on a detected signal strength of a connected AP. For example, consider the wireless device 110-c to be connected to the AP 105-a of BSS1. As the wireless device 110-c moves to the periphery of coverage area 125-a of the AP 105-a, the received signal strength from the AP 105-a will decrease. The wireless device 110-c moves closer to the AP 105-b and the AP 105-c. At some point, the roaming manager 140-a will cause the wireless device 110-c to roam to a different AP, such as the AP 105-b or the AP 105-c.

The roaming manager 140-a generates one or more channel maps based at least in part on channel scans at different locations. The wireless device 110-c may move between different locations within a BSS. The roaming manager 140-a can perform channel scans and save channel maps from different locations within the BSS.

Figure 3:
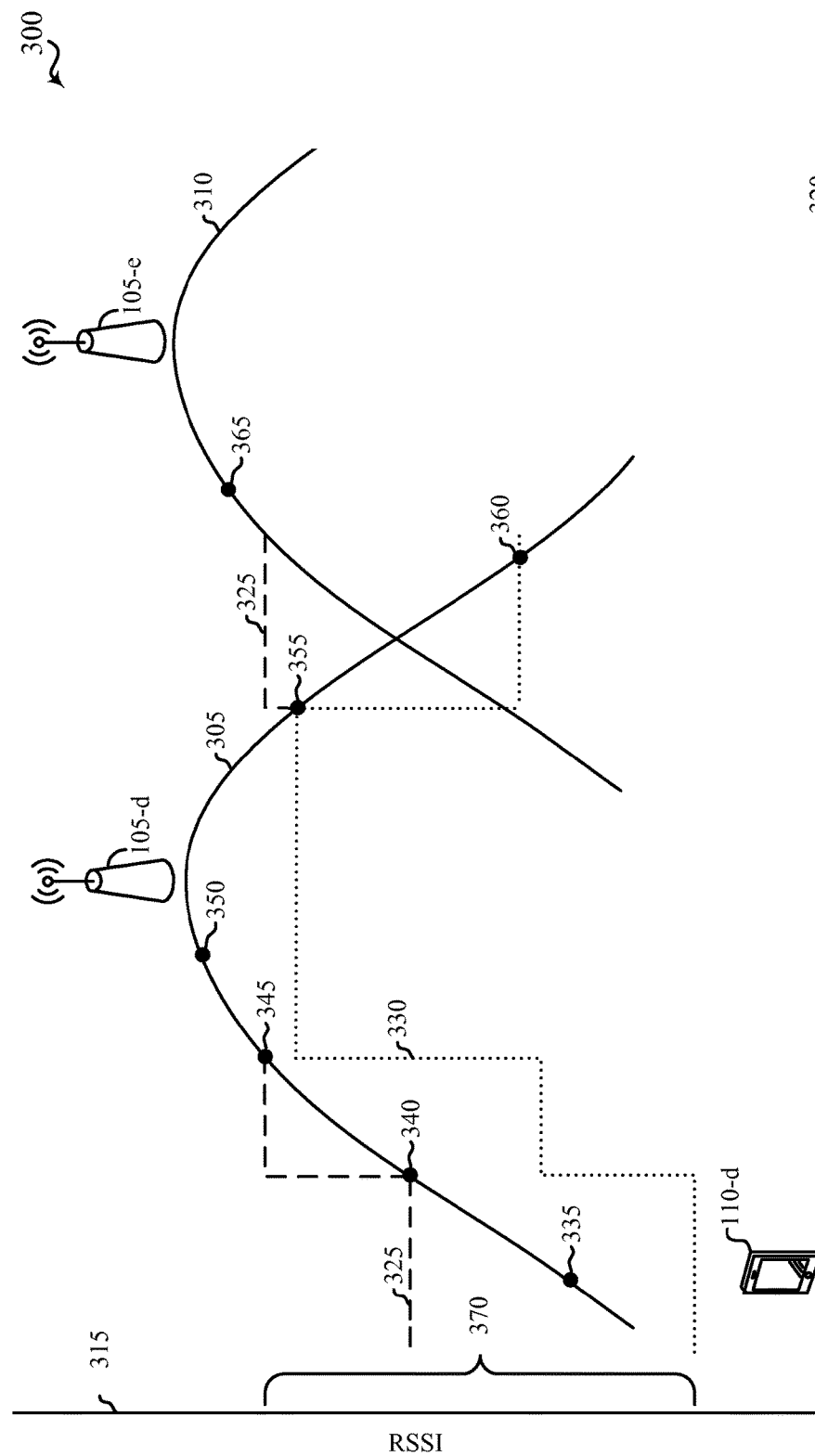
FIG. 3 illustrates a diagram showing example RSSI threshold levels as a wireless device moves through a high density AP environment in accordance with various aspects of the present disclosure.

FIG. 3 illustrates a diagram 300 showing example RSSI threshold levels as a wireless device 110-d moves through a high density AP environment in accordance with various aspects of the present disclosure. The diagram 300 includes a wireless device 110-d, and APs 105-d and 105-e, which are respective examples of the wireless device 110 and AP 105 of FIGS. 1 and 2. The diagram 300 shows RSSI on axis 315 versus location on axis 320. A curve 305 illustrates RSSI for an AP 105-d and a curve 310 illustrates RSSI for an AP 105-e. The RSSI level of a connected AP, in this example the AP 105-d, is discussed at various locations 335, 340, 345, 350, 355, 360, and 365 (i.e., different points in time) as the wireless device 110-d moves along axis 320 (e.g., a user is carrying the wireless device 110-d through a BSS of an AP 105-d). An active scan region 370 is illustrated as a range of RSSI values within which channel scans may be performed.

The wireless device 110-d takes RSSI values at different times. In one example, the wireless device 110-d takes RSSI values periodically. In another example, the wireless device 110-d takes RSSI values based on detected location changes, at instruction of the AP 105-d, or based on some other suitable factor.

A high RSSI threshold 325 and a low RSSI threshold 330 are illustrated. The wireless device 110-d may adjust the thresholds 325, 330 based on a detected RSSI of the connected AP. At location 335, the wireless device 110-d, via a roaming manager, for example, joins the AP 105-d and measures the RSSI level. The RSSI level is between the high RSSI threshold 325 and the low RSSI threshold 330. At this time, the wireless device 110-d does not perform any channel scans or adjusts either the high RSSI threshold 325 nor the low RSSI threshold 330. Example values of the high RSSI threshold 325 is −62 dBm and the low RSSI threshold 330 is −76 dBm. Other examples can use other values for the thresholds 325, 330.

After some time, the wireless device 110-d arrives at location 340. The RSSI value at location 340 is equal to or above the high RSSI threshold 325. Because the RSSI value breaches the high RSSI threshold 325, the wireless device 110-d updates the high RSSI threshold 325 and the low RSSI threshold 330. The wireless device 110-d does not perform a channel scan. Example values for the adjusted high RSSI threshold 325 is −55 dBm and the adjusted low RSSI threshold 330 is −68 dBm. Other examples can use other values for the thresholds 325, 330.

In some examples, the high RSSI threshold 325 may be defined as the minimum of the current RSSI+a delta_upper or −55 dBm. Delta_upper is a predefined amount of change. The low RSSI threshold 330 may be defined as the maximum of the current RSSI—a delta_lower or −76 dBm. Delta_lower is a predefined amount of change, which may be different than or the same as delta_upper. Both of the thresholds 325, 330 are updated when either of the two thresholds 325, 330 are breached for a minimum number of consecutive times. For example, if the high RSSI threshold 325 is breached twice in a row (e.g., without breaching the low RSSI threshold 330), the wireless device 110-d may update the high RSSI threshold 325 and the low RSSI threshold 330.

The wireless device 110-d continues to move along to location 345. At location 345, the detected RSSI value breaches the high RSSI threshold 325. The wireless device 110-d updates the low RSSI threshold 330 and does not perform a channel scan. An example value for the adjusted low RSSI threshold 330 is −58 dBm. However, other examples can use different values for the low RSSI threshold 330.

At location 350, the wireless device 110-d is close to the AP 105-d and the RSSI value is above the high RSSI threshold 325. When the current RSSI is equal to or above the active scan region (e.g., −76 dBm to −55 dBm), the high RSSI threshold 325 may be disabled or set to a very high value (e.g., 0 dBm). In some examples, the low RSSI threshold 330 may be set to the current RSSI value minus 3 dBm.

The wireless device 110-d continues to point 355, where the RSSI value drops to equal to or below the low RSSI threshold 330. Breaching the low RSSI threshold 330 causes the wireless device 110-d to perform a full channel scan and to update the low RSSI threshold 330. The low RSSI threshold 330 may be returned to the previous value, such as −66 dBm. A channel scan may be triggered when the low RSSI threshold 330 is breached a minimum number of consecutive times. In one example, a full channel scan may be triggered a single time when the low RSSI threshold 330 is breached and the RSSI is above a secondary threshold value (e.g., −60 dBm). The wireless device 110-d can use the full scan to update the channel map, which may enable shorter subsequent scans.

At point 360, the wireless device 110-d may be well within the BSS of the AP 105-e and the RSSI value from the AP 105-d has dropped at or below the low RSSI threshold 330. The breach of the low RSSI threshold 330 triggers the wireless device 110-d to perform a short channel scan. The wireless device 110-d may roam to the AP 105-e. At point 365, the wireless device 110-d measures an RSSI of the connected AP, which is now the AP 105-e.

Figure 4:
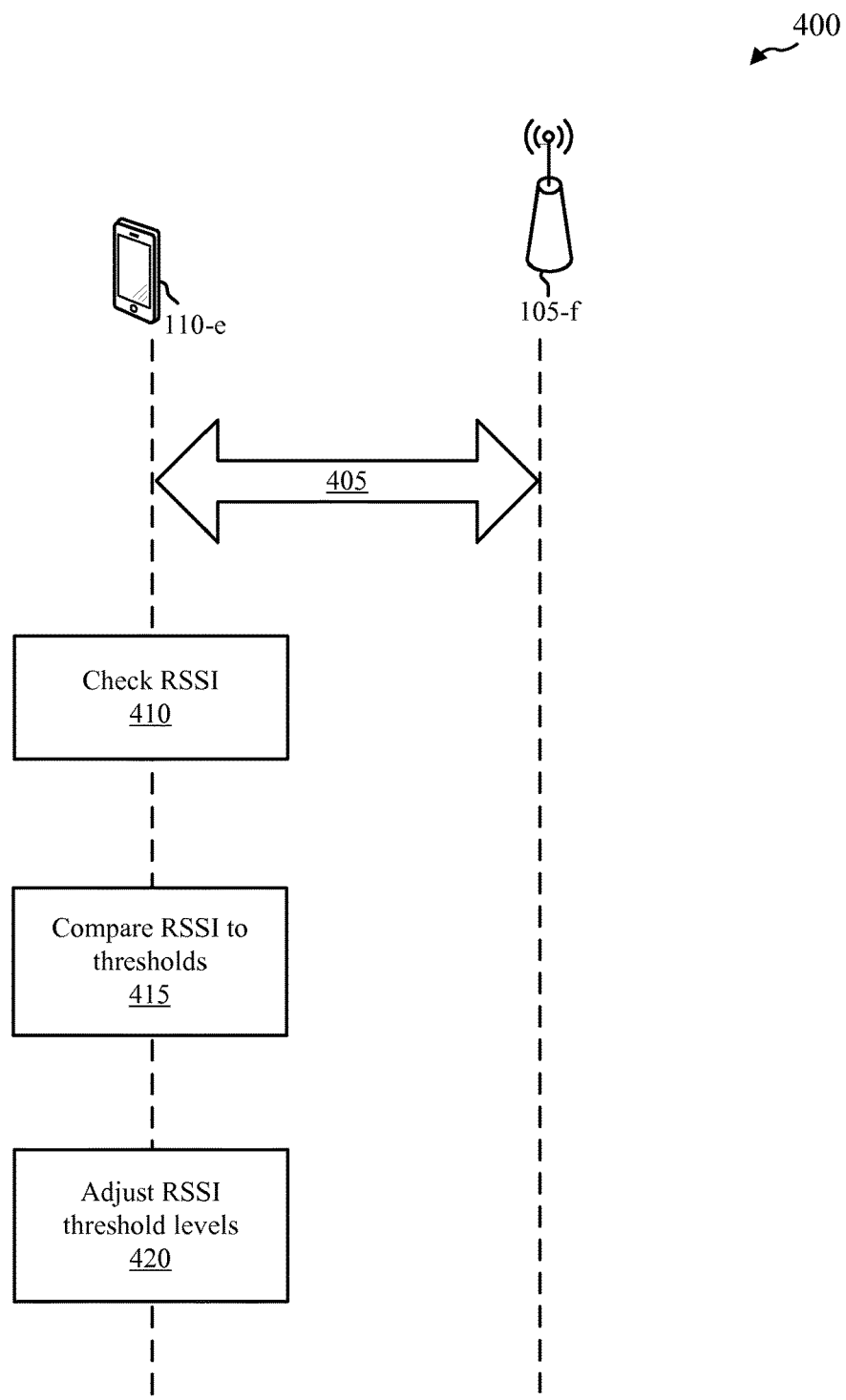
FIGS. 4-6 show process flows that illustrate examples of roaming enhancements in a WLAN in accordance with various aspects of the present disclosure.

FIG. 4 shows a process flow 400 that illustrates an example of roaming enhancements in a WLAN in a wireless communications system including a wireless device 110-e and an AP 105-f. The wireless device 110-e and the AP 105-f are respective examples of the wireless device 110 and AP 105 of FIGS. 1-3.

At block 405, the wireless device 110-e establishes a connection with the AP 105-f. In some cases, the wireless device 110-e is already associated with the AP 105-f, while in other cases, establishing a connection includes the wireless device 110-e associating with the AP 105-f.

At block 410, the wireless device 110-e determines a signal strength of the communication link between the wireless device 110-e and the AP 105-f. At block 415, the wireless device 110-e compares the signal strength value to at least a low threshold and a high threshold. In some examples, the low and high thresholds are a low RSSI threshold and a high RSSI threshold, respectively.

At block 420, based on the comparison of the signal strength value to the thresholds, the wireless device 110-e may adjust at least one of the threshold levels. For example, the wireless device 110-e adjusts the low threshold when the signal strength value is greater than the high threshold. In some examples, the wireless device 110-e adjusts the low threshold and the high threshold based at least in part on detecting, from the comparison, that the signal strength value has crossed the high threshold or the low threshold. In other examples, adjusting the low threshold is based at least in part on detecting, from the comparison, that the signal strength value has crossed the high threshold and the high threshold is above a predefined high threshold value.

Figure 5:
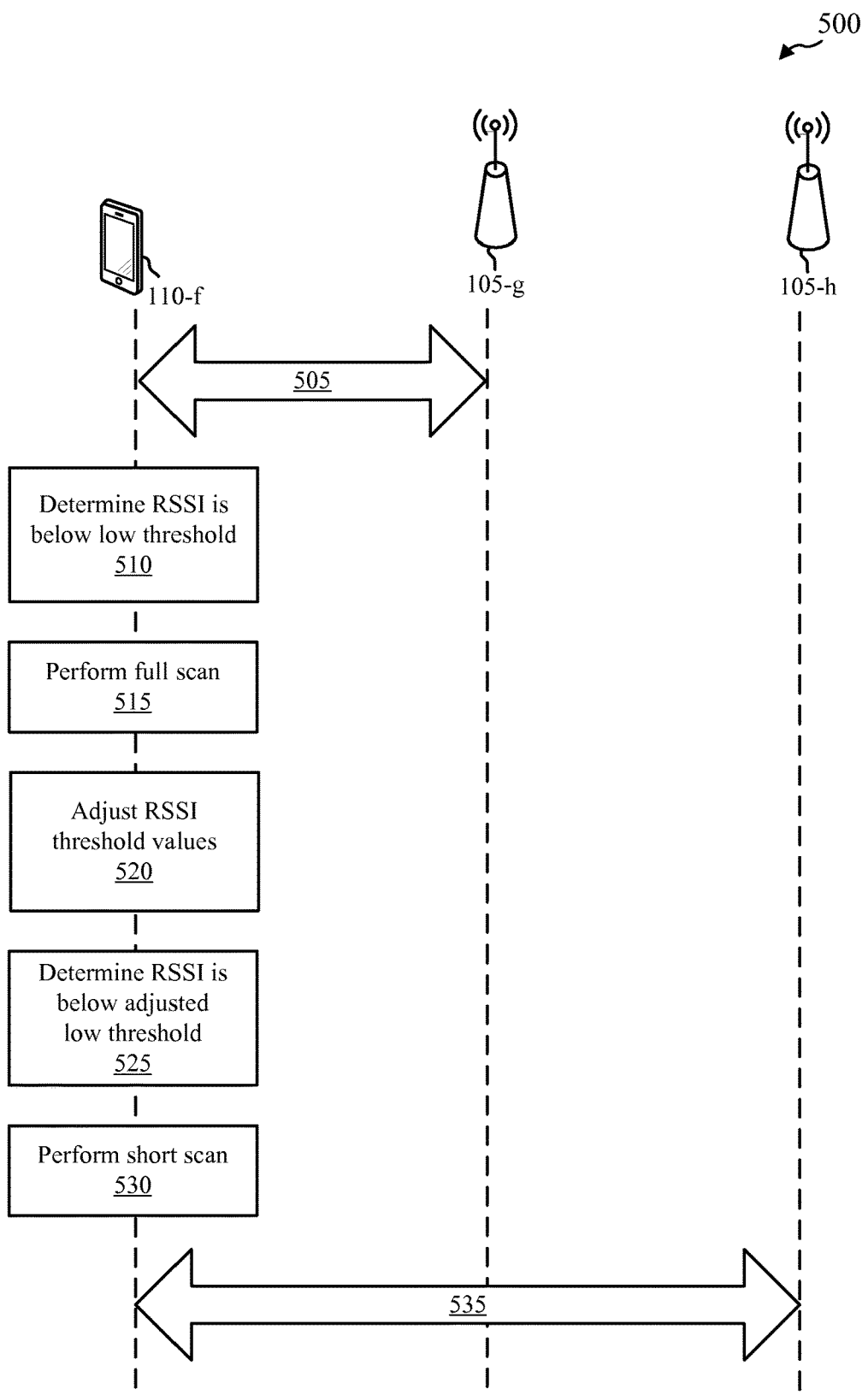

FIG. 5 shows a process flow 500 that illustrates an example of roaming enhancements in a WLAN in a wireless communications system including a wireless device 110-f and APs 105-g and 105-h. The wireless device 110-f and the APs 105-g and 105-h are respective examples of the wireless device 110 and AP 105 of FIGS. 1-4. The APs 105-g and 105-h are associated with different BSSs and communicate over different channels. In this example, the wireless device 110-f is capable of using enhanced roaming techniques to dynamically adjust RSSI threshold values and perform partial or full channel scans based on the RSSI values compared with the thresholds.

At block 505, the wireless device 110-f establishes a connection with the AP 105-g. In some cases, the wireless device 110-f is already associated with the AP 105-g, while in other cases, establishing a connection includes the wireless device 110-f associating with the AP 105-g. The wireless device 110-f may periodically measure RSSI values of the connection to the AP 105-g.

At block 510, the wireless device 110-f determines that the RSSI is below the low threshold. For example, this may correspond to point 355 shown in FIG. 3. The wireless device 110-f performs a full channel scan. In some examples, the wireless device 110-f performs one of a full scan using all available channels for the communication link and a partial scan using a subset of the available channels, wherein a selection of the full scan or the partial scan is based at least in part on the low threshold. In some examples, performing the channel scan further includes scanning all available channels when no channel map is available. In other examples, the wireless device 110-f determines that it is within a high density AP environment and performs the channel scan based on the wireless device 110-*f* being within the high density AP environment.

At block 520, the wireless device 110-*f* adjusts the RSSI threshold values. In one example, the wireless device 110-*f* only adjusts the low RSSI threshold value. In another example, the wireless device 110-*f* adjusts both the high and the low RSSI threshold values. The threshold RSSI values may still be within a predefined active region.

At block 525, the wireless device 110-*f* again determines that a current RSSI value is below the adjusted low RSSI threshold. In response to breaching the low RSSI threshold, the wireless device 110-*f* performs a short scan at block 530. In some examples, performing the channel scan includes the wireless device 110-*f* determining a subset of available channels for the communication link, wherein the subset includes available channels with the strongest signal based on a channel map. The wireless device 110-*f* performs a partial channel scan using the subset of available channels, wherein the available channels in the subset are scanned in an order from strongest to weakest. In another example, performing the channel scan further includes performing one of a full scan using all available channels for the communication link and a partial scan using a subset of the available channels, wherein a selection of the full scan or the partial scan is based at least in part on a likelihood of finding an AP, such as the AP 105-*h*, to roam to outside a subset of strongest available channels identified in a channel map.

Based on the short scan, the wireless device 110-*f* roams to the AP 105-*h* and establishes a communication link 535.

Figure 6:
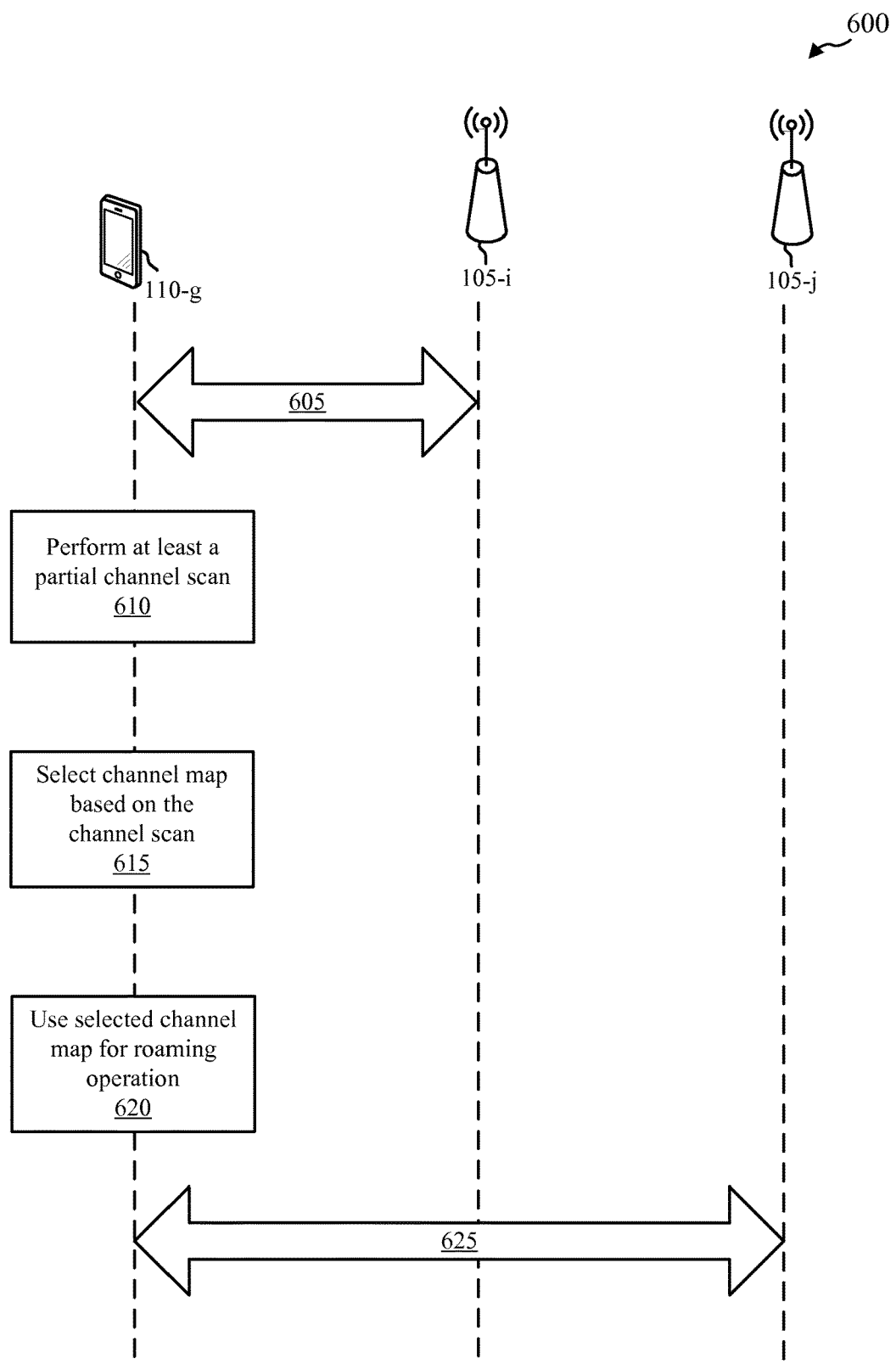

FIG. 6 shows a process flow 600 that illustrates an example of using multiple channel maps in a WLAN in a wireless communications system including a wireless device 110-*g* and APs 105-*i* and 105-*j*. The wireless device 110-*g* and the APs 105-*i* and 105-*j* are respective examples of the wireless devices 110 and APs 105 of FIGS. 1-5. The APs 105-*i* and 105-*j* are associated with different BSSs and communicate over different channels. In this example, the wireless device 110-*g* is capable of using enhanced roaming techniques to dynamically adjust RSSI threshold values and perform partial or full channel scans based on the RSSI values compared with the thresholds.

At block 605, the wireless device 110-*g* establishes a connection with the AP 105-*i*. The wireless device 110-*g* may periodically measure RSSI values of the connection to the AP 105-*i*. At block 610, the wireless device 110-*g* performs at least a partial channel scan. A partial or complete channel scan can be used to make a channel map. A channel map is a stored record that can indicate one or more of an associated BSSID of the connected AP, a channel of the connected AP, a channel of the neighboring AP, a BSSID of one or more neighboring APs, an RSSI of the one or more neighboring APs. Channel maps can also indicate a location of the wireless device 110-*g* when the channel scan was performed. Using channel map records can significantly reduce the occurrence of performing full channel scans.

The wireless device 110-*g* selects a channel map to use for roaming purposes based on the channel scan. In one example, selecting a channel map from a plurality of channel maps associated with the BSSID is based at least in part on the partial scan, wherein each of the channel maps associated with the BSSID comprises a different set of signal strength measurements for a same set of neighboring APs. The wireless device 110-*g* can compare a partial channel scan to a stored one of the channel maps for the BSSID. In some examples, selecting the one of the plurality of channel maps associated with the BSSID includes selecting the stored one of the channel maps if signal strength measurements for at least a portion of the set of neighboring APs from the partial scan are different by less than a threshold amount from corresponding signal strengths for the portion of the set of neighboring APs from the stored one of the channel maps. In some examples, the wireless device 110-*g* performs a full channel scan for the BSSID if signal strength measurements for at least a portion of the set of neighboring APs from the partial channel scan are different by more than a threshold amount from corresponding signal strengths for the portion of the set of neighboring APs from the stored one of the channel maps.

At block 620, the wireless device 110-*g* uses the selected channel map as a basis for a roaming operation. When conditions indicate a preferred or higher signal strength AP is available, such as the AP 105-*j*, the wireless device 110-*g* establishes a communication link 625 with the AP 105-*j*.

Figure 7A:
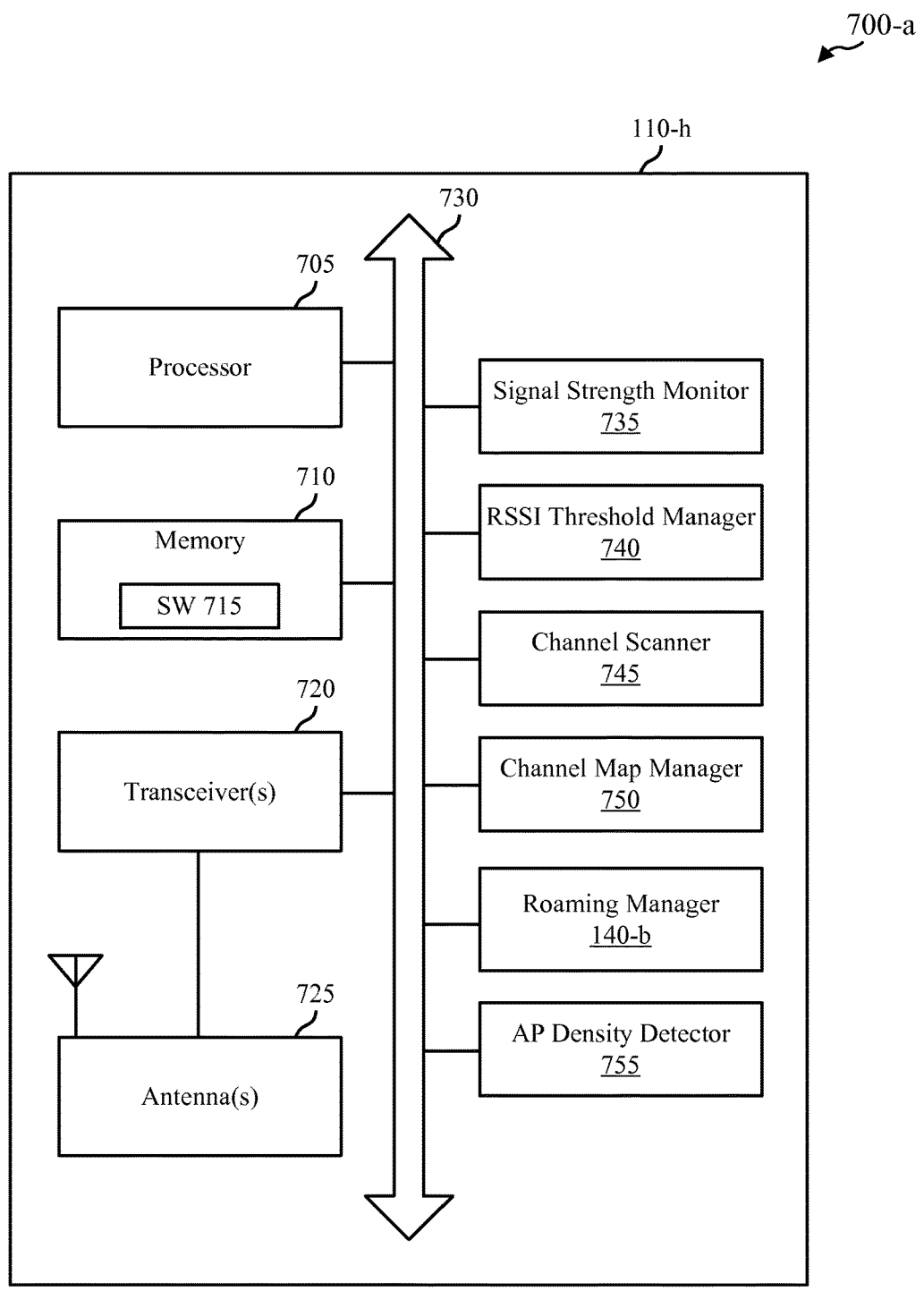
FIGS. 7A and 7B show block diagrams of examples of STAs that support roaming enhancements in a WLAN in accordance with various aspects of the present disclosure.

FIG. 7A shows a block diagram 700-*a* of an example wireless device 110-*h* that supports enhanced roaming features in a WLAN in accordance with various aspects of the present disclosure, and with respect to FIGS. 1-6. The wireless device 110-*h* includes a processor 705, a memory 710, one or more transceivers 720, one or more antennas 725, a signal strength monitor 735, a RSSI threshold manager 740, a channel scanner 745, a channel map manager 750, a roaming manager 140-*b*, and a AP density detector 755. The processor 705, memory 710, transceiver(s) 720, signal strength monitor 735, RSSI threshold manager 740, channel scanner 745, channel map manager 750, roaming manager 140-*b*, and AP density detector 755 are communicatively coupled with a bus 730, which enables communication between these components. The antenna(s) 725 are communicatively coupled with the transceiver(s) 720.

The processor 705 is an intelligent hardware device, such as a central processing unit (CPU), a microcontroller, an application-specific integrated circuit (ASIC), and the like. The processor 705 processes information received through the transceiver(s) 720 and information to be sent to the transceiver(s) 720 for transmission through the antenna(s) 725.

The memory 710 stores computer-readable, computer-executable software (SW) code 715 containing instructions that, when executed, cause the processor 705 or another one of the components of the wireless device 110-*h* to perform various functions described herein, for example, adjusting RSSI thresholds, triggering channel scans, and using multiple channel maps for a BSSID.

The transceiver(s) 720 communicate bi-directionally with other wireless devices, such as APs 105, wireless devices 110, or other devices. The transceiver(s) 720 include a modem to modulate packets and frames and provide the modulated packets to the antenna(s) 725 for transmission. The modem is additionally used to demodulate packets received from the antenna(s) 725.

The signal strength monitor 735, RSSI threshold manager 740, channel scanner 745, channel map manager 750, roaming manager 140-*b*, and AP density detector 755 implement the features described with reference to FIGS. 1-6, as further explained below.

Again, FIG. 7A shows only one possible implementation of a device executing the features of FIGS. 1-6. While the components of FIG. 7A are shown as discrete hardware blocks (e.g., ASICs, field programmable gate arrays (FPGAs), semi-custom integrated circuits, etc.) for purposes of clarity, it will be understood that each of the components may also be implemented by multiple hardware blocks adapted to execute some or all of the applicable features in hardware. Alternatively, features of two or more of the components of FIG. 7A may be implemented by a single, consolidated hardware block. For example, a single transceiver 720 chip may implement the processor 705, memory 710, signal strength monitor 735, RSSI threshold manager 740, channel scanner 745, channel map manager 750, roaming manager 140-b, and AP density detector 755.

Figure 7B:
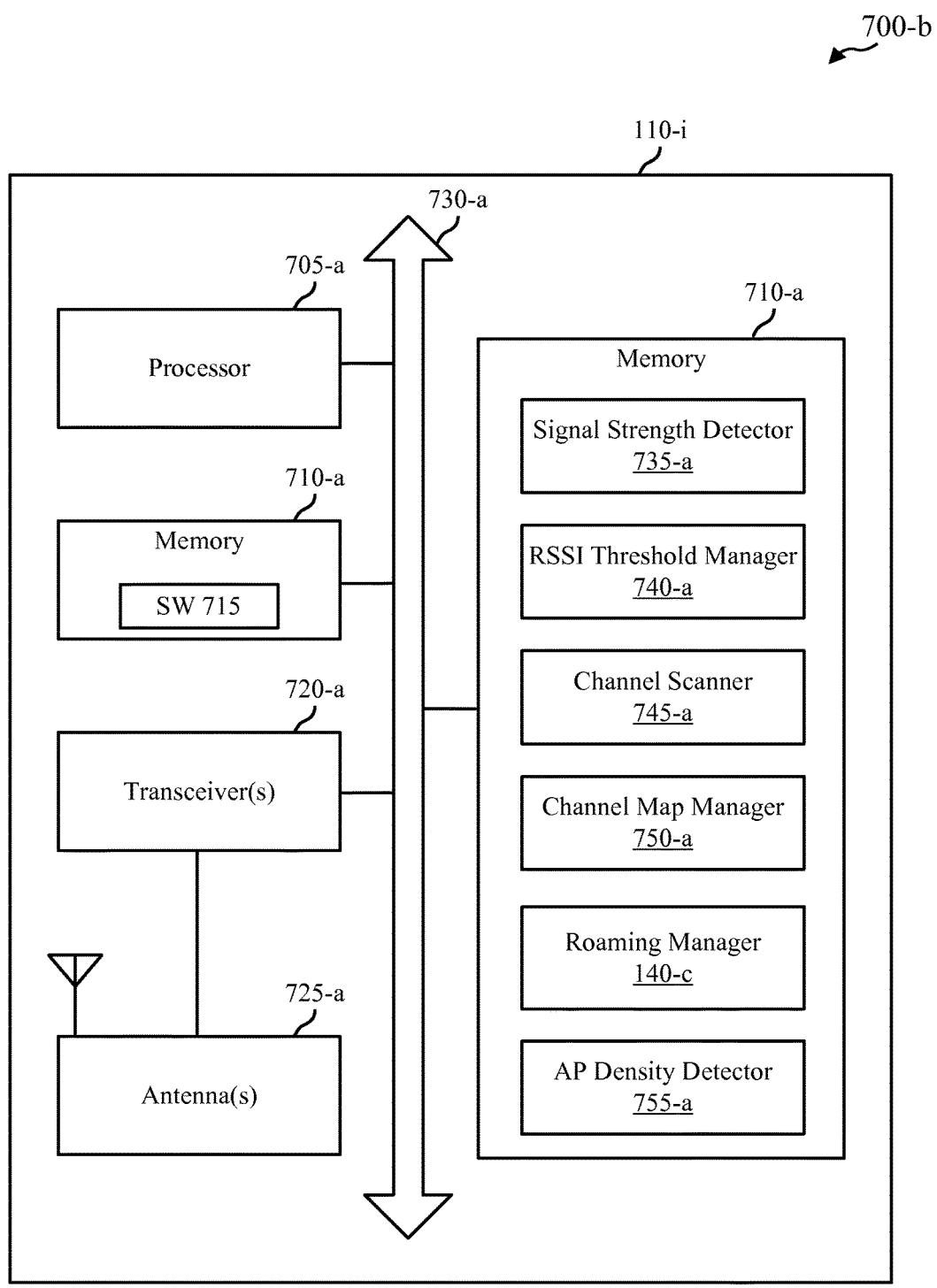

In still other examples, the features of each component may also be implemented, in whole or in part, with instructions embodied in a memory, formatted to be executed by one or more general or application-specific processors. For example, FIG. 7B shows a block diagram 700-b of another example of a wireless device 110-i in which the features of the signal strength monitor 735-a, the RSSI threshold manager 740-a, the channel scanner 745-a, the channel map manager 750-a, the roaming manager 140-c, and the AP density detector 755-a are implemented as computer-readable code stored on memory 710-a and executed by one or more processors 705-a. Other combinations of hardware/software may be used to perform the features of one or more of the components of FIGS. 7A-7B.

Figure 8:
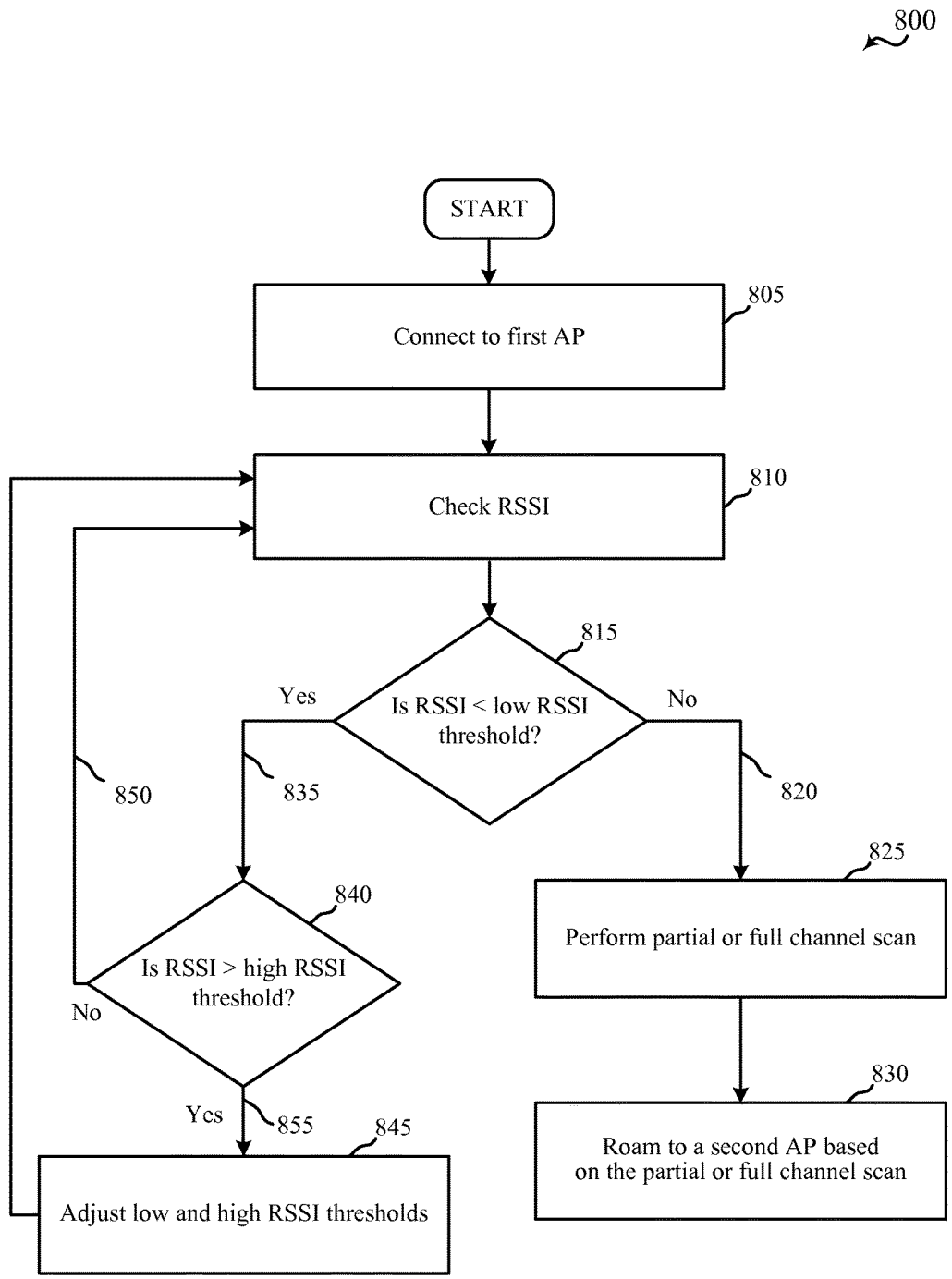
FIGS. 8-10 show flow charts that illustrate examples of methods for roaming enhancements in a WLAN in accordance with various aspects of the present disclosure.

FIG. 8 shows a flow chart that illustrates one example of a method 800 for wireless communication, in accordance with various aspects of the present disclosure. The method 800 may be performed by any of the wireless devices 110 discussed in the present disclosure, but for clarity the method 800 will be described from the perspective of the wireless devices 110-h and 110-i, of FIGS. 7A and 7B.

Broadly speaking, the method 800 illustrates a procedure by which the wireless device 110-h or 115-i determines a signal strength of a communication link between itself and an AP, compares the signal strength value to at least a low threshold and a high threshold, performs a channel scan for the communication link when the signal strength value is below the low threshold, and adjusts the low threshold when the signal strength value is greater than the high threshold.

The method 800 begins with the wireless device 110-h or 110-i, operating in a high density AP environment. At block 805, the wireless device 110-h or 110-i connects to a first AP. The transceiver(s) 720 may exchange data with the first AP to establish connections. Alternatively, the wireless device 110-h or 110-i may be previously connected.

At block 810, the signal strength monitor 735 measures an RSSI level associated with traffic over the channel of the first AP. The RSSI threshold manager 740 compares the current RSSI level to a current low RSSI threshold at block 815. If the current RSSI level is below the low RSSI threshold, the method 800 follows path 820 to block 825. At block 825, the channel scanner 745 performs a partial or a full channel scan. If this is the first breach of the low RSSI threshold, the method 800 may perform a partial channel scan and return to block 810 to check the current RSSI level. Alternatively, if this is an $n^{th}$ consecutive breach of the low RSSI threshold, the method 800 may do a full channel scan and proceed to block 830. Using the results from the channel scan, the roaming manager 140-c causes the wireless device 110-h or 110-i to roam to another, second AP at block 830. The signal strength monitor 735 continues to monitor the RSSI levels of the second AP.

If the current RSSI level was above the low RSSI threshold at block 815, the method 800 proceeds along path 835 to block 840. At block 840, the RSSI threshold manager 740 compares the current RSSI level to a current high RSSI threshold. If the current RSSI level is above the high RSSI threshold, the method 800 proceeds along path 855 to block 845. At block 845, the RSSI threshold manager 740 adjusts the low and high RSSI thresholds. In some examples, the RSSI threshold manager 740 adjusts the thresholds according to a specific amount, which may be based on a previous level. Alternatively, the RSSI threshold manager 740 may set the RSSI thresholds based on one or more factors such as how dense the AP environment is, how many wireless devices are connected to the APs, desired signal quality, power saving considerations, and the like.

If the current RSSI level is below the high RSSI threshold, the method 800 proceeds along path 850 and returns to block 810 where the signal strength monitor 735 measures an RSSI level associated with traffic over the channel of the first AP.

In alternative examples, the current RSSI levels being equal to the high or low RSSI threshold is also considered a breach of the respective threshold.

In another alternative example, the method 800 includes a 5G preference. Because of the dynamic high RSSI threshold setting, a 5G preference scan can be triggered when the high RSSI threshold is breached for a maximum of three times. In other examples, the 5G preference scan is triggered when the high RSSI threshold is breached for a different number of times. Dynamically setting the high RSSI threshold prevents unsuccessful repetitive 5G preference scans, as opposed to having a specific 5G preference scan trigger (e.g., perform 5G preference scan when the RSSI rises above a specific threshold, such as −65 dB). In some examples, when the wireless device 110 is associated with 5G AP with a strong RSSI, the wireless device 110 does not scan for 2G APs. In some examples, the channel scanner 745 does not scan in the active scan region in a low density AP environment, except for maintaining the 5G preference scan.

In another example, mini-advanced wireless controller (MAWC) sensor information is used to determine if a scan needs to be performed whenever roaming trigger occurs. For example, if the MAWC state is not "walking," then limit the scan to roaming triggers in the active scan region.

In another example, the method 800 includes the AP density detector 755 determining that the wireless device 110 is within a high density AP environment. The AP density detector 755 identifies an AP environment as being high density if at least one of the following are true: a large number of APs (e.g., 8 or more) are detected and some of their RSSI values are very high; a middle point between a connected AP's RSSI and the highest RSSI of a neighboring AP is above −70 dBm; and a scan indicates that the current environment is similar to a channel map record, and the channel map record indicates a dense environment. The techniques described herein may, in some examples, only be implemented when a high density AP environment is detected.

Thus, the method 800 may provide for wireless communication. It should be noted that the method 800 is just one implementation and that the operations of the method 800 may be rearranged or otherwise modified such that other implementations are possible.

Figure 9:
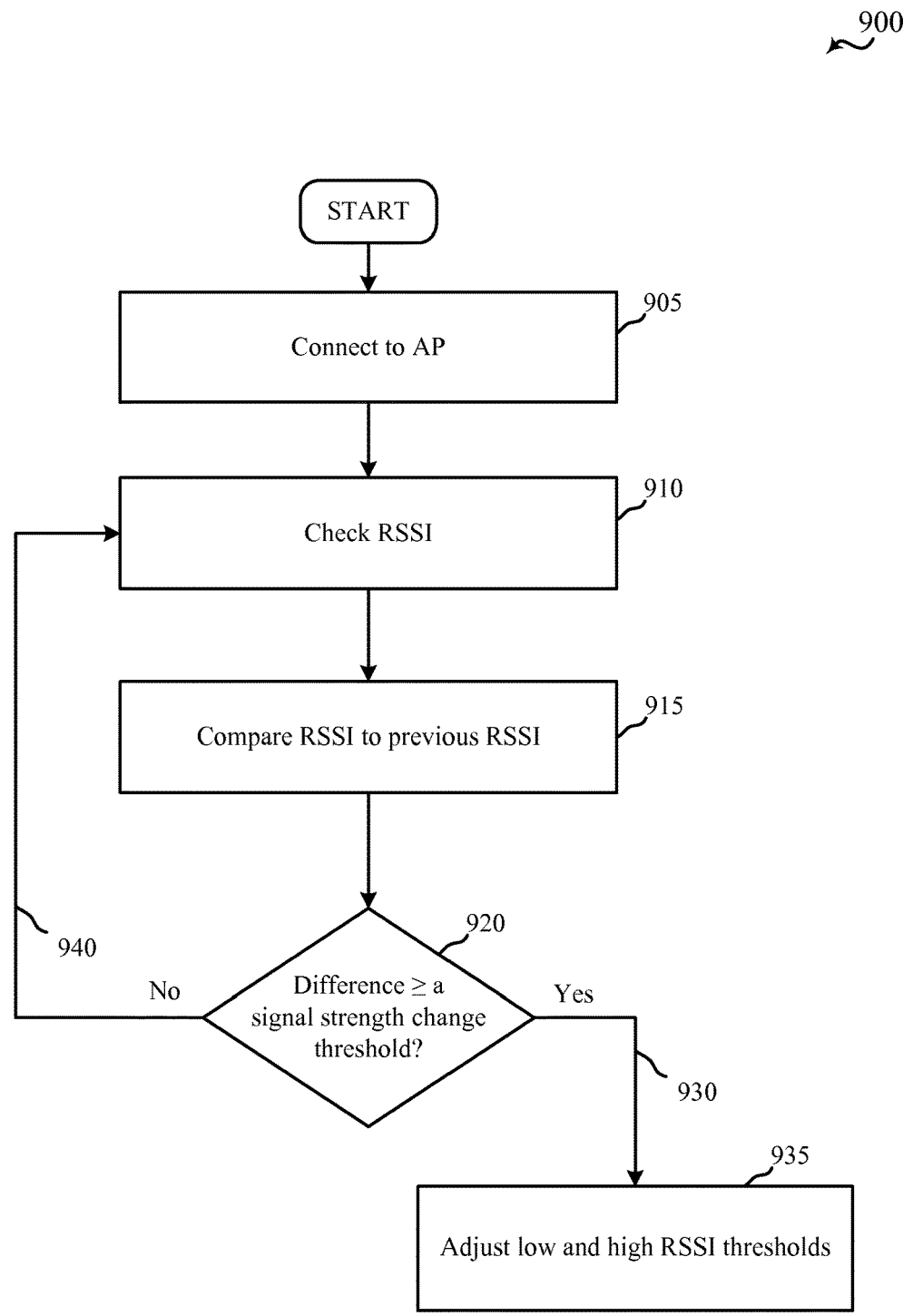

FIG. 9 shows a flow chart that illustrates one example of a method 900 for wireless communication, in accordance with various aspects of the present disclosure. The method 900 may be performed by any of the wireless devices 110 discussed in the present disclosure, but for clarity the method 900 will be described from the perspective of the wireless devices 110-h and 110-i, of FIGS. 7A and 7B. Broadly speaking, the method 900 illustrates a procedure by which the wireless device 110-h or 115-i adjusts at least one of a high and low RSSI threshold based on a difference in consecutive RSSIs being greater than or equal to a signal strength change threshold.

The method 900 begins with the wireless device 110-*h* or 110-*i*, operating in a high density AP environment. At block 905, the wireless device 110-*h* or 110-*i* connects to an AP. The transceiver(s) 720 may exchange data with the AP to establish connections. In Alternative examples, the wireless device 110-*h* or 110-*i* may be previously connected to the AP.

At block 910, the signal strength monitor 735 measures an RSSI level associated with traffic over the channel of the AP. The RSSI threshold manager 740 compares the current RSSI level to previously measured RSSI level at block 915. The previously measured RSSI level may be the immediately previous measured RSSI level. If the difference between the current RSSI level and the previous RSSI level is greater than or equal to a signal strength change threshold, the method follows path 930 to block 935.

At block 935, the RSSI threshold manager 740 adjusts the low and high RSSI thresholds. In some examples, the RSSI threshold manager 740 adjusts the thresholds according to a specific amount, which may be based on a previous level. Alternatively, the RSSI threshold manager 740 may set the RSSI thresholds based on one or more factors such as how dense the AP environment is, how many wireless devices are connected to the APs, desired signal quality, power saving considerations, and the like.

If, at block 920, the difference between the current RSSI level and the previous RSSI level is less than the signal strength change threshold, the method 900 proceeds along path 940 to block 910. At block 910, the signal strength monitor 735 measures an RSSI level associated with traffic over the channel of the AP.

The method 900 shows an alternative to adjusting the high and low RSSI thresholds than that shown in FIG. 8. Aspects of the method 900 may be substituted into the method 800. Thus, the method 900 may provide for wireless communication. It should be noted that the method 900 is just one implementation and that the operations of the method 900 may be rearranged or otherwise modified such that other implementations are possible.

Figure 10:
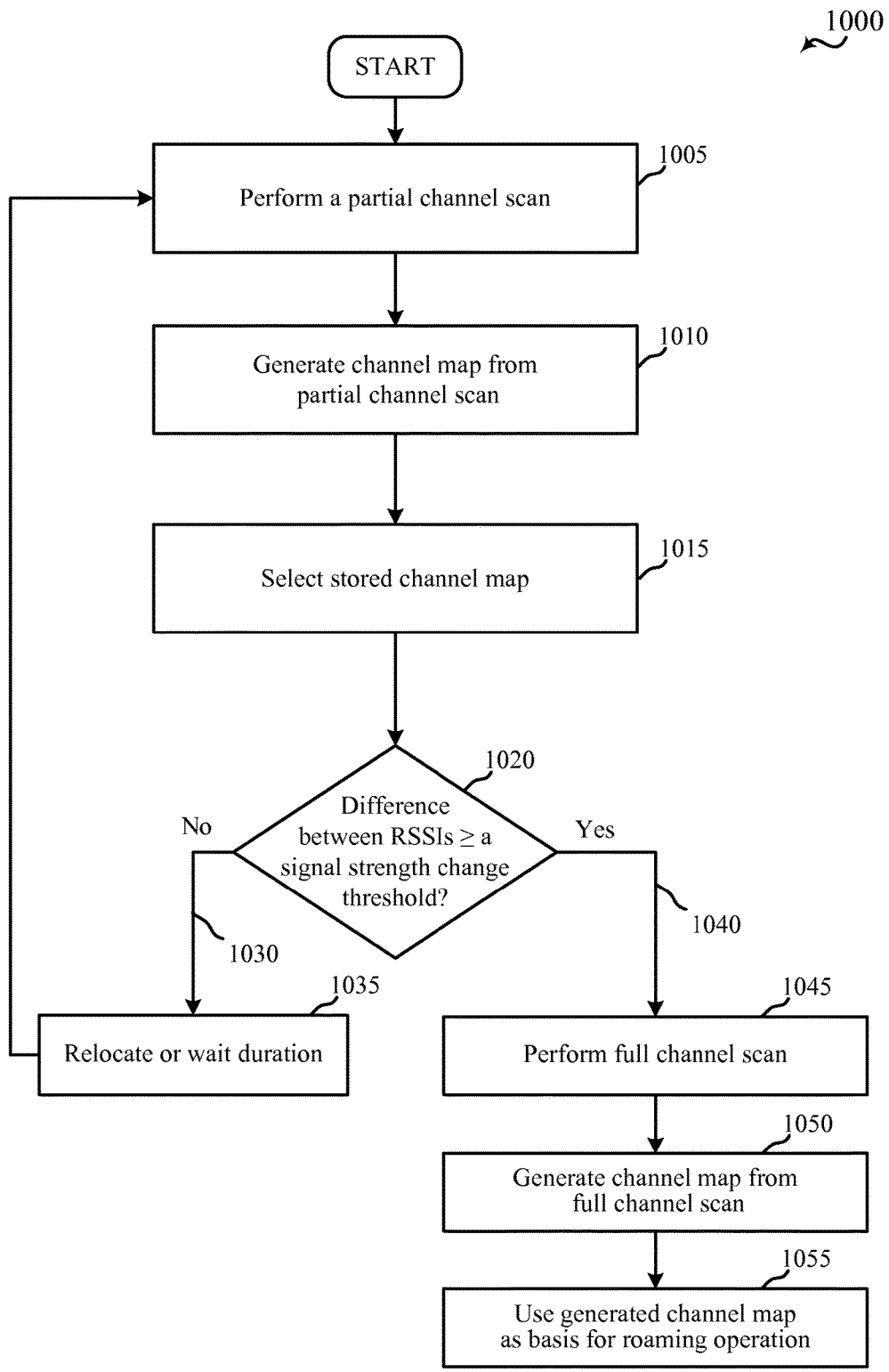

FIG. 10 shows a flow chart that illustrates one example of a method 1000 for wireless communication, in accordance with various aspects of the present disclosure. The method 1000 may be performed by any of the wireless devices 110 discussed in the present disclosure, but for clarity the method 1000 will be described from the perspective of the wireless devices 110-*h* and 110-*i*, of FIGS. 7A and 7B.

Broadly speaking, the method 1000 illustrates a procedure by which the wireless device 110-*h* or 115-*i* performs at least a partial channel scan by a communications device while the communications device is connected to an AP associated with a BSSID, selects a channel map from a plurality of channel maps associated with the BSSID based at least in part on the partial scan, wherein each of the channel maps associated with the BSSID comprises a different set of signal strength measurements for a same set of neighboring APs, and uses the selected channel map as a basis for a roaming operation by the wireless device.

The method 1000 begins with the wireless device 110-*h* or 110-*i*, operating in a high density AP environment, performing a partial channel scan at block 1005. The channel scanner 745 performs the partial scan. At block 1010, the channel map manager 750 generates at least a portion of a channel map from the partial scan.

At block 1015, the channel map manager 750 selects a stored channel map to compare to the currently generated channel map. The stored channel map may be selected based on a proximity to a current location of the wireless device 110-*h* or 110-*i* (e.g., the location of the wireless device 110-*h* or 110-*i* when the current channel map was generated).

At block 1020, the RSSI threshold manager 740 determines whether a difference between the RSSI levels of the current channel map and the stored channel map is greater than or equal to a signal strength change threshold. If not, the method 1000 proceeds along path 1030 to block 1035. At block 1035, the wireless device 110-*h* or 110-*i* relocates to a different location or a predetermined time period elapses. After the relocation or wait, the method 1000 returns to block 1005 to perform another partial channel scan.

If the RSSI threshold manager 740 determines that the difference between the RSSI levels of the current channel map and the stored channel map is less than a signal strength change threshold, the method 1000 proceeds along path 1040 to block 1045. At block 1045, the channel scanner 745 performs a full channel scan. For example, the method 1000 includes performing a full channel scan for the BSSID if signal strength measurements for at least a portion of the set of neighboring APs from the partial channel scan are different by more than a threshold amount from corresponding signal strengths for the portion of the set of neighboring APs from the stored one of the channel maps. At block 1050, the channel map manager 750 generates a channel map from the full channel scan and stores the channel map. The channel map may identify a location of where the wireless device 110-*h* or 110-*i* was when the channel map was generated. At block 1055, the roaming manager 140-*c* may use the generated channel map as a basis for a roaming operation. That is, the method 1000 includes storing a new channel map as one of the plurality of channel maps based at least in part on the full channel scan, wherein the selected channel map is the new channel map. In some examples, different channel maps of the plurality of channel maps each represent a different location with respect to the AP.

In another example, the current channel scan is identified as similar to a previously stored channel map record if at least three neighboring APs in the current channel scan have similar RSSI levels recorded for the same three APs in the stored channel map record.

The method 1000 can also include generating a first one of the plurality of channel maps based at least in part on a first full channel scan at a first location, relocating to a second location, and generating a second one of the plurality of channel maps based at least in part on a second full channel scan at the second location.

Thus, the method 1000 may provide for wireless communication. It should be noted that the method 1000 is just one implementation and that the operations of the method 1000 may be rearranged or otherwise modified such that other implementations are possible. For example, instead of waiting or relocating at block 1035, the method 1000 includes using the selected stored channel map as a basis for roaming operations. This alternative may be used when RSSI values indicates that the wireless device 110-*h* or 110-*i* should roam to another AP.

In some examples, aspects from two or more of the methods 800, 900, and 1000 may be combined. It should be noted that the methods 800, 900, and 1000 are just example implementations, and that the operations of the methods 800, 900, and 1000 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
  determining a plurality of consecutive signal strength values of a communication link between a wireless device and an access point (AP);
  comparing the plurality of consecutive signal strength values to at least a low threshold and a high threshold;
  performing one of a full channel scan using all available channels or a partial channel scan using a subset of the available channels for the communication link when at least a signal strength value of the plurality of consecutive signal strength values is below the low threshold and based at least in part on a determination that the plurality of consecutive signal strength values are above the high threshold or below the low threshold for a number of the consecutive signal strength values, wherein a selection of the full channel scan or the partial channel scan is based at least in part on the low threshold;
  detecting a change in the signal strength value larger than or equal to a signal strength change threshold;
  adjusting the low threshold when the signal strength value is greater than the high threshold and based at least in part on detecting the change in the signal strength value.

2. The method of claim 1, further comprising:
  adjusting the low threshold and the high threshold based at least in part on detecting, from the comparison, that the signal strength value has crossed the high threshold or the low threshold.

3. The method of claim 1, wherein performing one of the full channel scan and the partial channel scan further comprises:
  determining the subset of available channels for the communication link, wherein the subset includes available channels with the strongest signal based on a channel map; and performing the partial channel scan using the subset of available channels, wherein the available channels in the subset are scanned in an order from strongest to weakest signal.

4. The method of claim 1, further comprising:
triggering a 5G preference scan when the signal strength value is equal to or above the high threshold a predefined number of times.

5. The method of claim 1, wherein performing one of the full channel scan and the partial channel scan further comprises:
scanning all available channels when no channel map is available.

6. The method of claim 1,
wherein the selection of the full channel scan or the partial channel scan is further based at least in part on a likelihood of finding an AP to roam to outside a subset of strongest available channels identified in a channel map.

7. The method of claim 1, further comprising:
determining that the wireless device is within a high density AP environment, wherein performing one of the full channel scan and the partial channel scan is further based on the wireless device being within the high density AP environment.

8. The method of claim 1, further comprising:
adjusting the low threshold based at least in part on detecting, from the comparison, that the signal strength value has crossed the high threshold and the high threshold is above a predefined high threshold value.

9. A communication device for wireless communication, comprising:
a signal strength monitor to determine a plurality of consecutive signal strength values of a communication link between a wireless device and an access point (AP);
a signal strength threshold manager to compare the plurality of consecutive signal strength values to at least a low threshold and a high threshold and detect a change in the signal strength value larger than or equal to a signal strength change threshold;
a channel scanner to perform one of a full channel scan using all available channels or a partial channel scan using a subset of the available channels for the communication link when at least a signal strength value of the plurality of consecutive signal strength values is below the low threshold and based at least in part on a determination that the plurality of consecutive signal strength values are above the high threshold or below the low threshold for a number of the consecutive signal strength values, wherein a selection of the full channel scan or the partial channel scan is based at least in part on the low threshold; and
the signal strength threshold manger to further adjust the low threshold when the signal strength value is greater than the high threshold and based at least in part on detecting the change in the signal strength value.

10. The communication device of claim 9, the signal strength threshold manger to further adjust the low threshold and the high threshold based at least in part on detecting, from the comparison, that the signal strength value has crossed the high threshold or the low threshold.

11. The communication device of claim 9, wherein the channel scanner is further to:

determine the subset of available channels for the communication link, wherein the subset includes available channels with the strongest signal based on a channel map; and
perform the partial channel scan using the subset of available channels, wherein the available channels in the subset are scanned in an order from strongest to weakest signal.

12. The communication device of claim 9, further comprising:
a roaming manager to trigger a 5G preference scan when the signal strength value is equal to or above the high threshold a predefined number of times.

13. A communication device for wireless communication, comprising:
means for determining a plurality of consecutive signal strength values of a communication link between a wireless device and an access point (AP);
means for comparing the plurality of consecutive signal strength values to at least a low threshold and a high threshold;
means for detecting a change in the signal strength value larger than or equal to a signal strength change threshold;
means for performing one of a full channel scan using all available channels or a partial channel scan using a subset of the available channels for the communication link when at least a signal strength value of the plurality of consecutive signal strength values is below the low threshold and based at least in part on a determination that the plurality of consecutive signal strength values are above the high threshold or below the low threshold for a number of the consecutive signal strength values, wherein a selection of the full channel scan or the partial channel scan is based at least in part on the low threshold;
means for adjusting the low threshold when the signal strength value is greater than the high threshold and based at least in part on detecting the change in the signal strength value.

14. The communication device of claim 13, further comprising:
means for adjusting the low threshold and the high threshold based at least in part on detecting, from the comparison, that the signal strength value has crossed the high threshold or the low threshold.

15. The communication device of claim 13, wherein means for performing the channel scan further comprises:
means for determining the subset of available channels for the communication link, wherein the subset includes available channels with the strongest signal based on a channel map; and
means for performing the partial channel scan using the subset of available channels, wherein the available channels in the subset are scanned in an order from strongest to weakest signal.

16. A non-transitory computer-readable medium storing code for wireless communication at a wireless station, the code comprising instructions executable to cause a communication device to:
determine a plurality of consecutive signal strength values of a communication link between a wireless device and an access point (AP);
compare the plurality of consecutive signal strength values to at least a low threshold and a high threshold;
detect a change in the signal strength value larger than or equal to a signal strength change threshold;

perform one of a full channel scan using all available channels or a partial channel scan using a subset of the available channels for the communication link when at least a signal strength value of the plurality of consecutive signal strength values is below the low threshold and based at least in part on a determination that the plurality of consecutive signal strength values are above the high threshold or below the low threshold for a number of the consecutive signal strength values;

adjust the low threshold when the signal strength value is greater than the high threshold and based at least in part on detecting the change in the signal strength value.

17. The non-transitory computer-readable medium of claim 16, the code further comprising instructions executable to cause the communication device to:

adjusting the low threshold and the high threshold based at least in part on detecting, from the comparison, that the signal strength value has crossed the high threshold or the low threshold.

18. The non-transitory computer-readable medium of claim 16, wherein the code to perform the channel scan further comprises code to:

determine the subset of available channels for the communication link, wherein the subset includes available channels with the strongest signal based on a channel map; and perform the partial channel scan using the subset of available channels, wherein the available channels in the subset are scanned in an order from strongest to weakest signal.

* * * * *